United States Patent [19]

Myers

[11] Patent Number: 4,549,865

[45] Date of Patent: Oct. 29, 1985

[54] BLOW MOLDING APPARATUS

[75] Inventor: Robert A. Myers, Perrysburg, Ohio

[73] Assignee: Owens-Illinois, Inc., Toledo, Ohio

[21] Appl. No.: 594,076

[22] Filed: Mar. 28, 1984

[51] Int. Cl.$^4$ .............................................. B29F 1/00
[52] U.S. Cl. .............................. 425/342.1; 264/542;
425/182; 425/526; 425/540
[58] Field of Search ............ 425/540, 538, 539, 450.1,
425/451.4, 182, 342.1, 451, 193; 264/542

[56] References Cited

U.S. PATENT DOCUMENTS

| | | | |
|---|---|---|---|
| 2,784,452 | 3/1957 | Ruekberg et al. | 425/536 |
| 3,310,834 | 3/1967 | Simpson et al. | 425/182 |
| 3,550,206 | 12/1970 | Von Der Heide | 425/182 |
| 3,767,345 | 10/1973 | Doughty et al. | 425/540 |
| 3,785,761 | 1/1974 | Logomasini et al. | 425/540 |

FOREIGN PATENT DOCUMENTS

WO80/01655  6/1981  PCT Int'l Appl. ................ 425/539

Primary Examiner—Jay H. Woo
Assistant Examiner—J. Fortenberry
Attorney, Agent, or Firm—Philip M. Rice

[57] ABSTRACT

A blow molding apparatus comprising a wheel plate, a shaft extending horizontally and supporting the wheel plate for rotation and a hub removably mounted on the shaft for rotation with the shaft, and a plurality of sets of molds defining a mold cavity when closed, each set comprising a pair of mold sections, a first mold section of each set being mounted on the hub such that the mold sections are circumferentially spaced about the hub, a second mold section of each set being mounted on the wheel in circumferentially spaced relation and radial alignment with the first mentioned mold section. The second mold sections are mounted on slide assemblies for supporting the second mold sections for movement toward and away from the first mold sections. The hub has circumferentially spaced external surfaces for supporting the first mold sections, the number of surfaces corresponding to the number of first mold sections. The hub may be removed and a second hub replaced on the shaft, having a plurality of circumferentially spaced surfaces, the number of the surfaces of the second hub differing from the number of surfaces of the first hub. The wheel plate accommodates a different number of slide assemblies to correspond with the different number of mold surfaces of the second hub.

23 Claims, 14 Drawing Figures

BLOW MOLDING APPARATUS

This invention relates to blow molding apparatus and particularly to blow molding machines of the wheel type.

BACKGROUND AND SUMMARY OF THE INVENTION

In blow molding machines of the wheel type, a wheel supports a plurality of circumferentially spaced sets of molds and is generally rotated about a horizontal axis. Plastic tubing is continuously extruded downwardly between the open mold sections and then the molds are closed as they move about an annular path and the portion of the tubing within the molds is blown within the confines of the mold to provide a hollow article which may be a container.

One of the limitations with such machines is that they are usually designed to handle a predetermined number of molds for making articles of a certain range of sizes. If smaller or larger articles are to be made, a different machine must be used. This, of course, requires a substantial investment in machines.

Accordingly, among the objectives of the present invention are to provide a blow molding machine that can be accommodate a variety of numbers of molds and mold sizes.

In accordance with the invention, the blow molding apparatus comprises a wheel plate, a shaft extending horizontally and supporting the wheel plate for rotation and a hub removably mounted on the shaft for rotation with the shaft, and a plurality of sets of molds defining a mold cavity when closed, each set comprising a pair of mold sections, a first mold section of each set being mounted on the hub such that the mold sections are circumferentially spaced about the hub, a second mold section of each set being mounted on the wheel in circumferentially spaced relation and radial alignment with the first mentioned mold section. The second mold sections are mounted on slide assemblies for movement toward and away from the first mold sections. The hub has circumferentially spaced external surfaces for supporting the first mold sections, the number of surfaces corresponding to the number of first mold sections. The hub may be removed and a second hub replaced on the shaft, having a plurality of circumferentially spaced surfaces, the number of the surfaces of the second hub differing from the number of surfaces of the first hub. The wheel plate accommodates a different number of slide assemblies to correspond with the different number of mold surfaces on the second hub.

In accordance with another aspect of the invention, the wheel plate accommodates mold mounting means in the form of slide assemblies that can be readily positioned, removed and adjusted circumferentially of the wheel plate.

DESCRIPTION

Referring to the Figures, the blow molding apparatus embodying the invention comprises a frame 20 in which a shaft 21 is mounted for rotation about a horizontal axis by spaced bearings in cantilever fashion. A wheel plate 22 is mounted on the shaft 21 for rotation with the shaft 21 and supports a plurality of circumferentially spaced slide assemblies 23. A hub 25 is also mounted on the shaft and has a plurality of circumferentially spaced mold supporting surfaces 26 corresponding in number to the number of slide assemblies 23.

Figure 1:
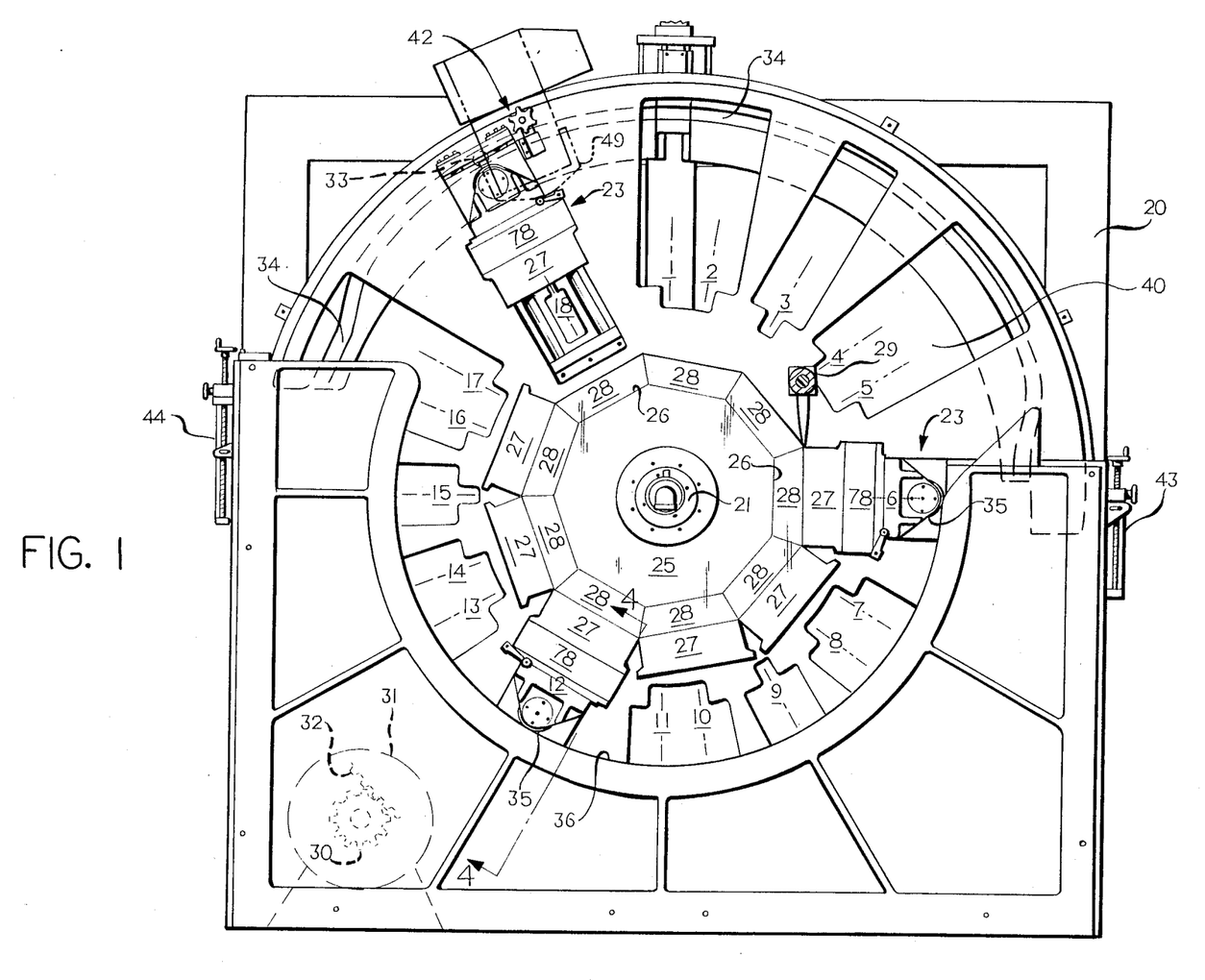
FIG. 1 is a front elevational view of a blow molding apparatus embodying the invention, parts being broken away.
Figure 2:
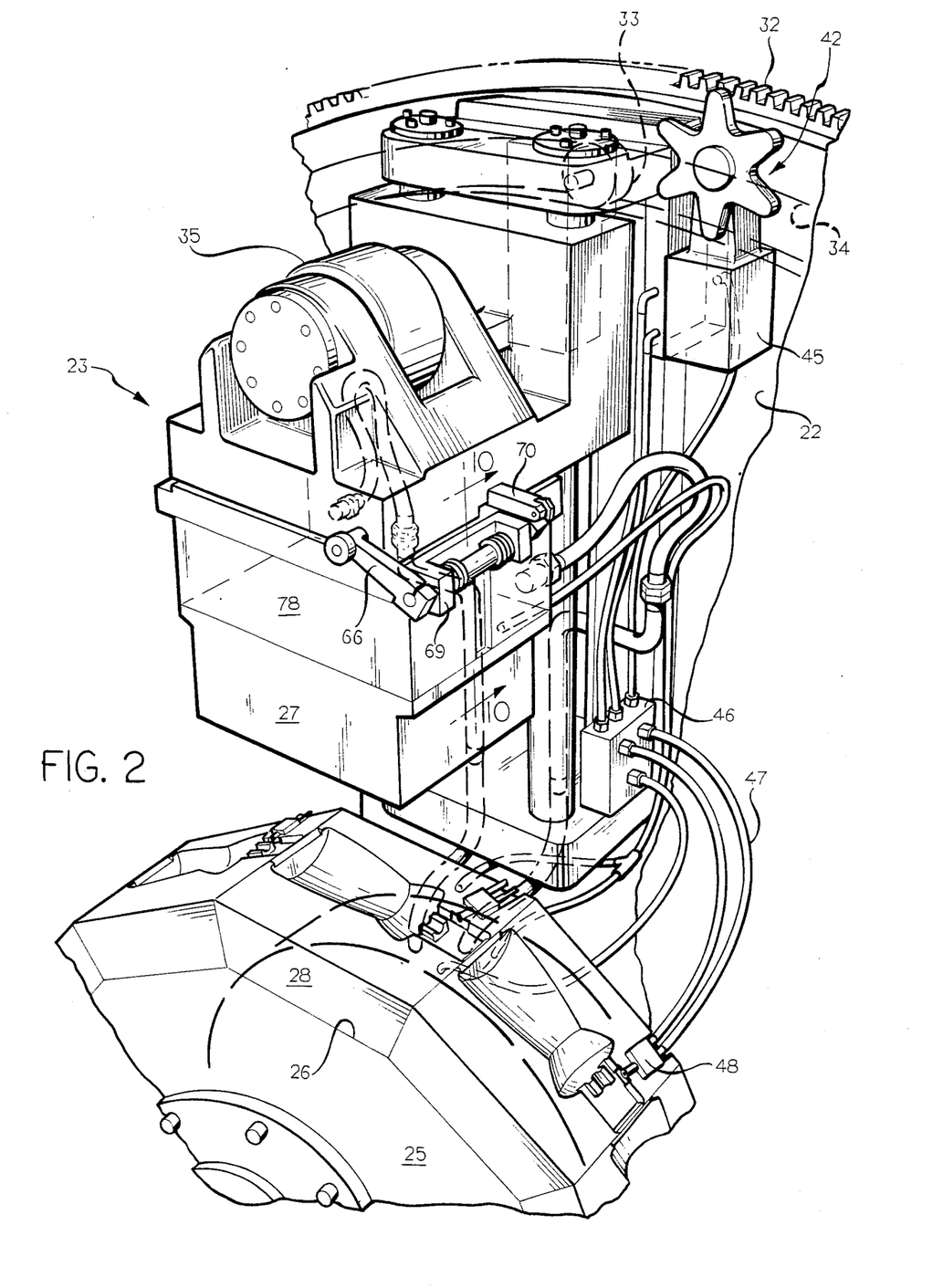
FIG. 2 is a fragmentary perspective view on an enlarged scale of a portion of the apparatus.

Each slide assembly 23 comprises mold section mounting means for supporting a section or part 27 of mold and the corresponding surface 26 of the hub 25 supports the second section 28 of a mold. Each slide assembly 23 is adapted to move the mold section 27 toward and away from the other mold section 28 to close about a plasticized parison emanating from an extruder head 29 so that the parison can be blown to the shape of the mold cavity defined by the mold sections 27, 28 as the wheel rotates. The parison is provided from the head 29 of an extruder in the two o'clock position as shown in FIG. 1.

Wheel plate 22 is rotated by a gear 30 driven by a motor 31 and meshing with a gear 32 on the periphery of the wheel plate. Each slide assembly 23 includes a cam follower 33 which engages a fixed arcuate cam 34 on the frame 20 to move mold section 27 toward and away from mold section 28. A second cam follower 35 on each slide assembly 23 engages a second fixed cam 36 on frame 20 to hold the mold sections 27, 28 in closed and clamped position. Second cam 36 extends generally from the three o'clock position to just beyond the nine o'clock position as viewed in FIG. 1. The specific structure of each slide assembly 23 is disclosed and claimed in the application of Eric Johnson, Ser. No. 594,073, filed concurrently with the present application and having a common assignee, which is incorporated herein by reference.

Figure 3:
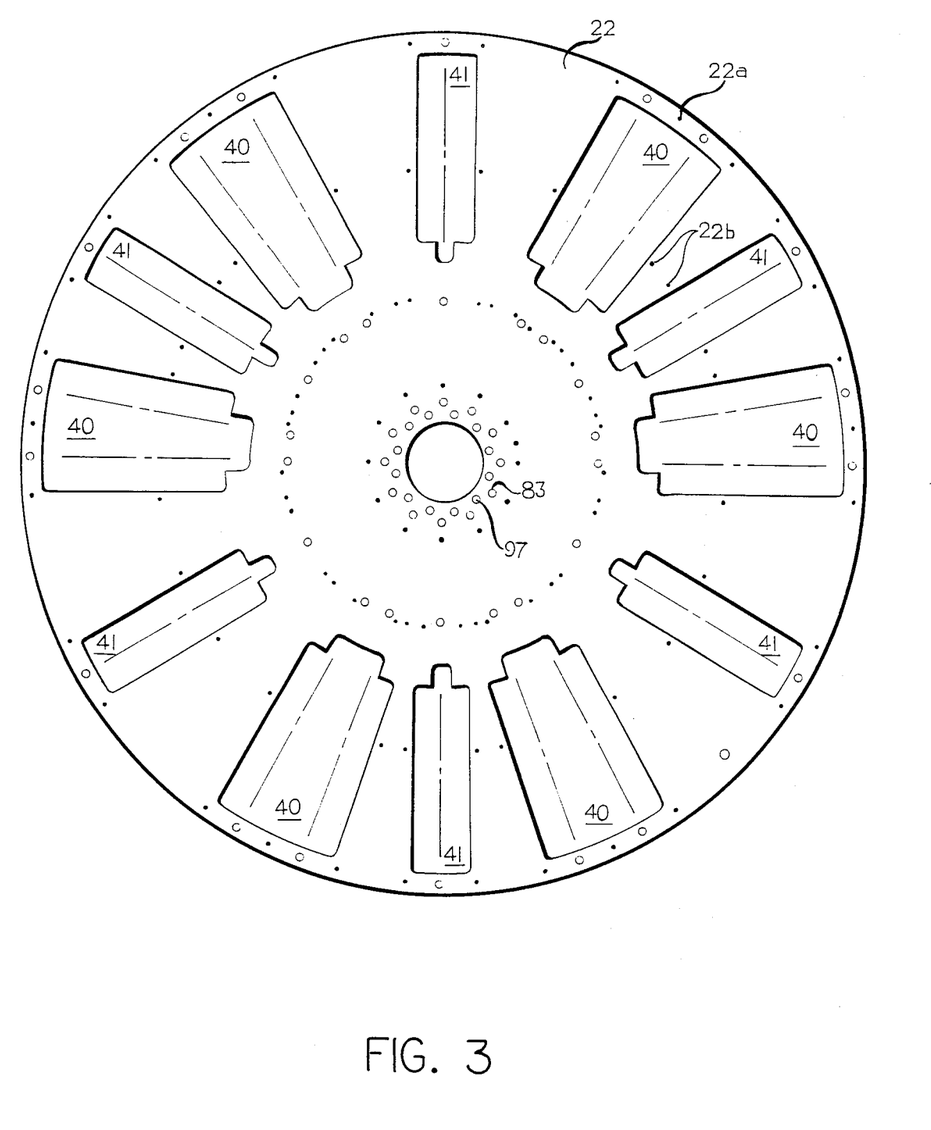
FIG. 3 is an elevational view of the rotating wheel plate forming a part of the apparatus.
Figures 4, 5, 6:
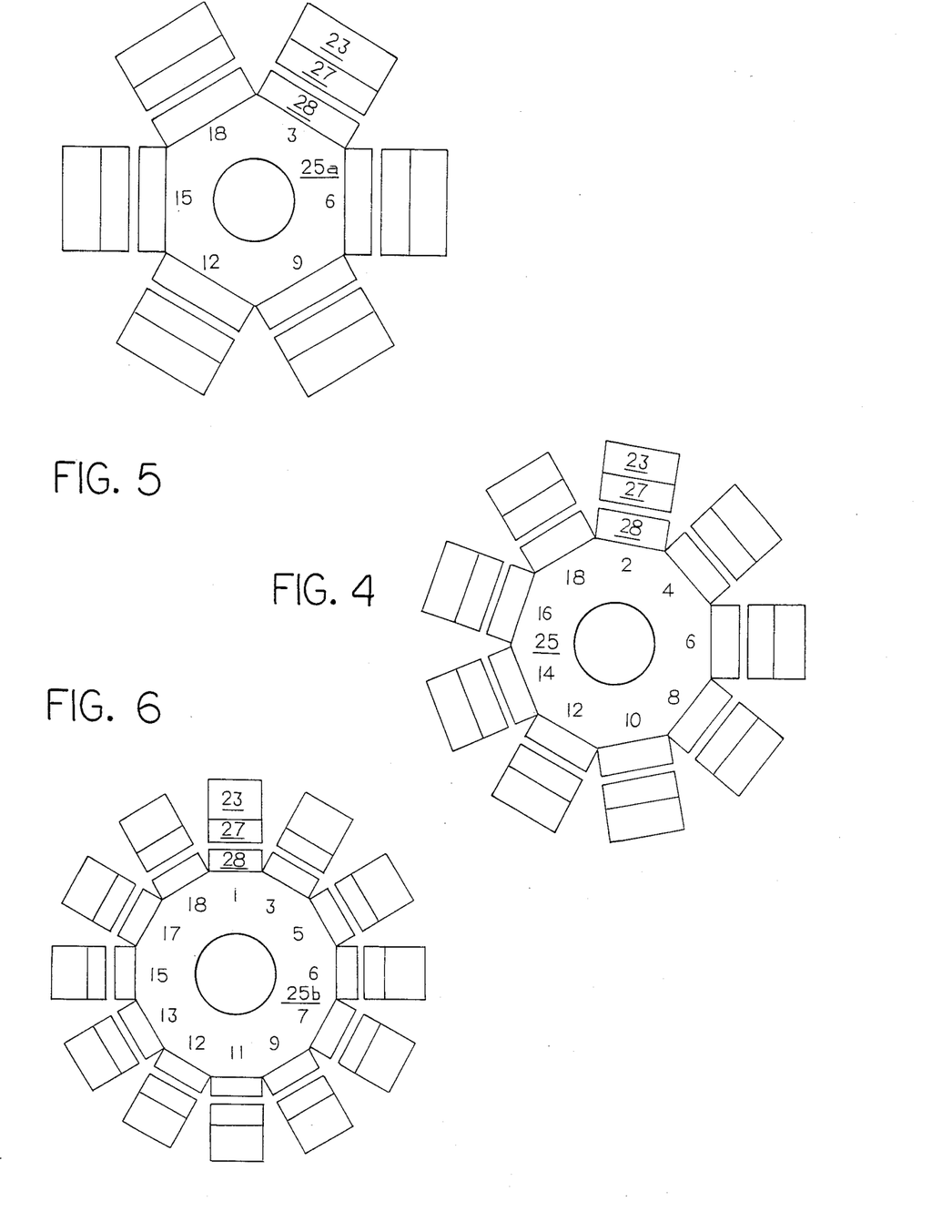
FIGS. 4, 5 and 6 are diagrammatic views showing relative arrangements of molds in the apparatus.

The wheel plate 22 is provided with means for supporting the slide assemblies 23 in various multiples as shown diagrammatically in FIGS. 3, 4, 5 and 6, namely, a total of 18 different positions. By this arrangement, slide assemblies 23 can be provided in equal circumferentially spaced relation in sets of six, nine and twelve. Hub 25 has nine mold section supporting surfaces 26 (FIGS. 1, 4). The hub 25 is removable so that a hub 25a can be provided with six mold section supporting surfaces 26 (FIG. 5) or a hub 25b can be provided with twelve mold section supporting surfaces 26 (FIG. 6).

More specifically, as shown in FIG. 3, plate 22 is provided with circumferentially spaced cutouts or openings 40,41 of two different sizes, one opening 40 having a greater circumferential width than the other opening 41 in order that the mold assemblies can be positioned as required. Slide assemblies are supported by bolts extending through the frame of each slide assembly into threaded openings 22a,22b, a sufficient number of openings being provided to accommodate various positions of the slide assemblies. The presence of the openings permits the slide assembly to be mounted on one surface with the first cam follower 33 projecting through the opening for engagement with the first cam 34. In the larger openings 40, two positions for the same slide assembly are provided. In the smaller openings 41, a single position is accommodated.

An air valve assembly 42 is provided on each slide assembly 23 and is actuated by an actuator 43 along the path of the molds that functions to turn the blow air on for blowing the article and another actuator 44 is provided along the path to function to turn the air valve assembly 42 off cutting off the flow of blow air to the blowing apparatus. Each valve assembly 42 includes an on-off valve 45 that functions to control the flow of blow air to a valve block 46 and, in turn, through lines 47 to a blow pin 48 which functions to provide blow air for blowing the hollow article when the molds are closed, in a manner well known in the art. The valve assemblies 42, 44 and actuator assemblies 43, 44 are disclosed and claimed in the application of Merritt Warren Martin, Ser. No. 594,075, filed concurrently with the present application, now U.S. Pat. No. 4,523,904 and having a common assignee, which is incorporated herein by reference.

In operation, the plastic material is continuously extruded from the head 29 of the extruder and flows downwardly between the mold sections 27, 28. As the wheel plate continues to rotate, the mold sections 27, 28 are brought together pinching the plastic material and air is supplied to the interior of the tubular parison to blow the article in a manner well known in the art. As the article reaches the position when the blow mold is open (12 o'clock position as viewed in FIG. 1), a fixed actuator 49 contacts an ejector on each mold section 28 to eject the articles onto a conveyor.

Figure 8A:
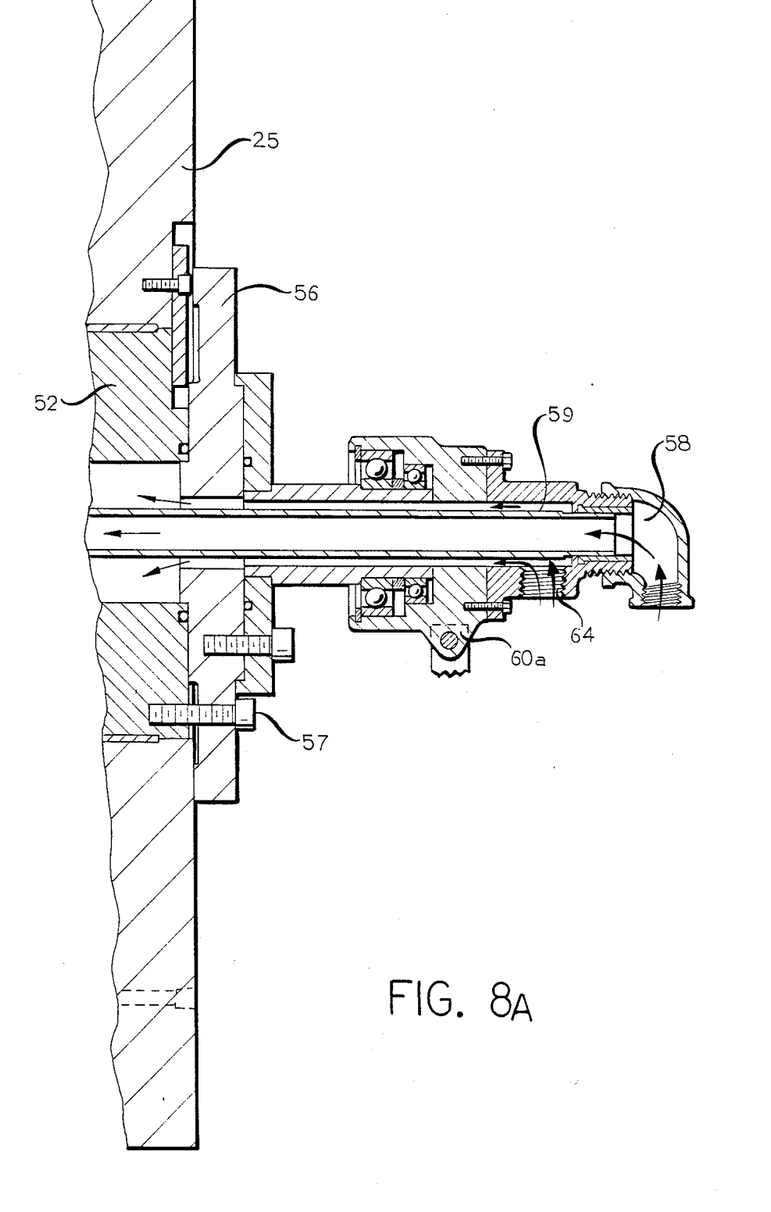
FIGS. 8A, B and C are fragmentary longitudinally sectional views of the shaft support and cooling portions of the apparatus.
Figure 8B:
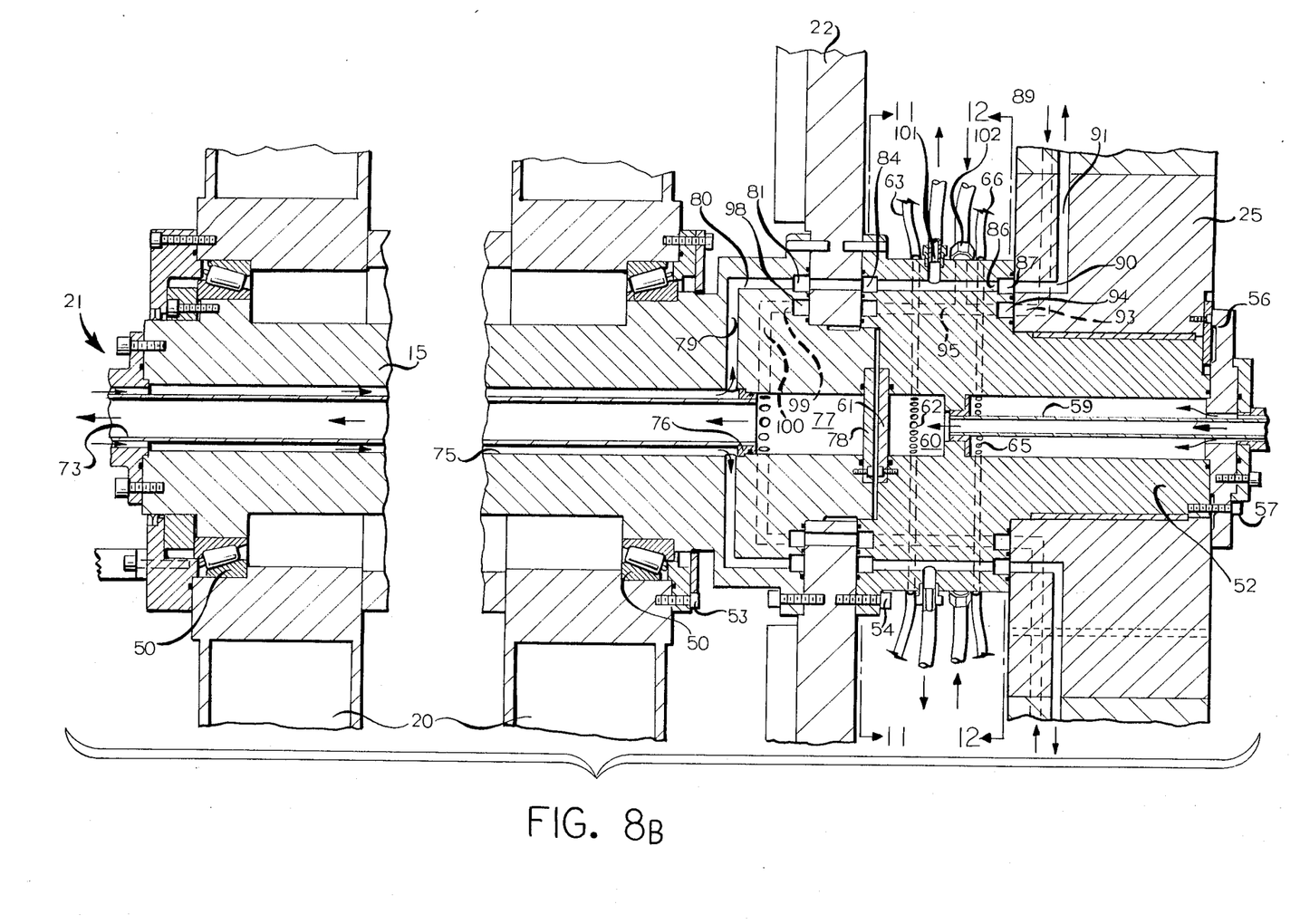
Figure 8C:
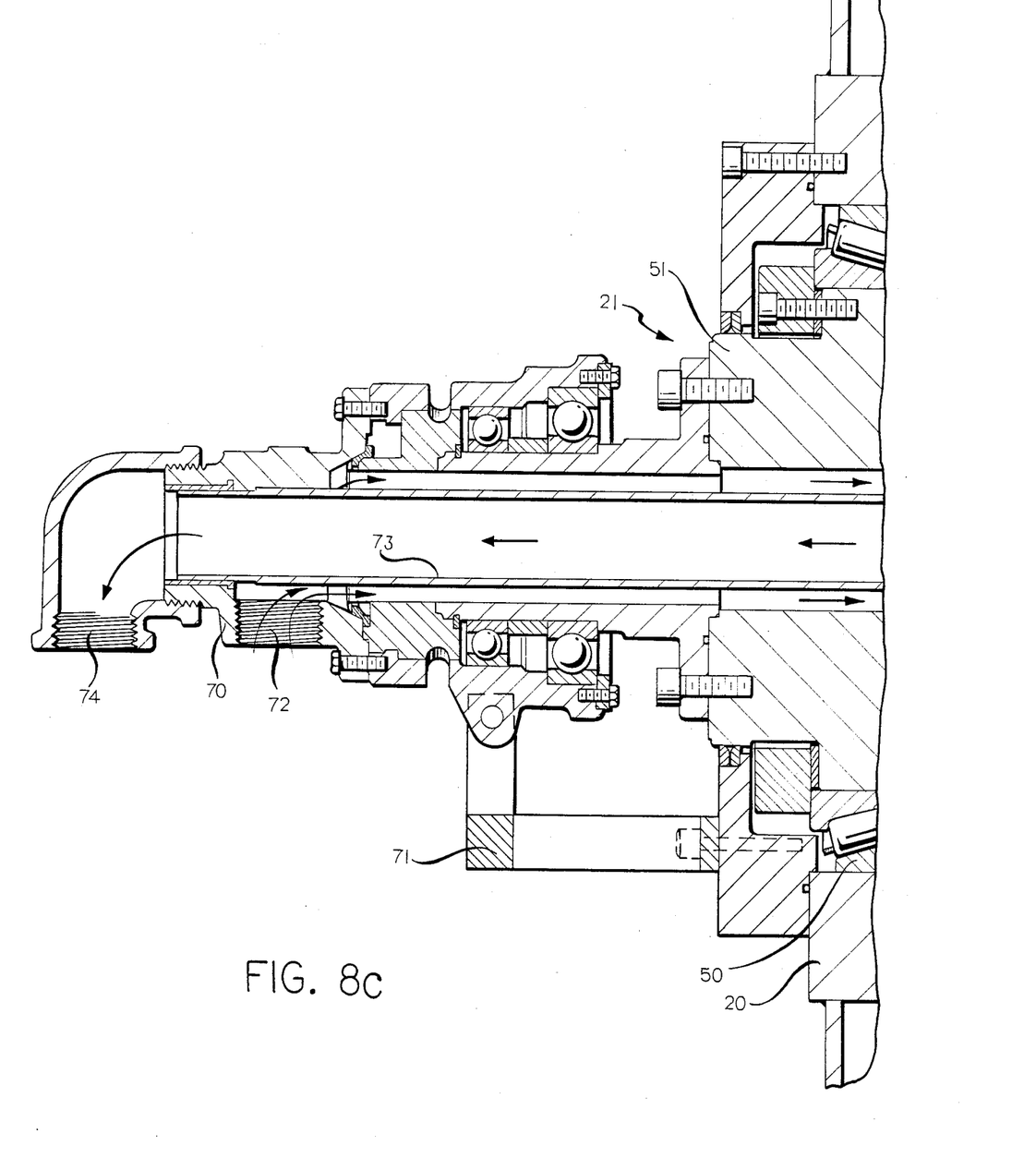

Referring to FIGS. 8A, B and C, shaft 21 is rotatably mounted in the frame 20 by roller bearings 50 and comprises a first section 51 and a second section 52. Wheel plate 22 is telescoped onto the end of the first section 51 and held in position by keys 22a and bolts 53. The second section 52 is then telescoped over the end of the first section 51 and fastened to the wheel plate by bolts 54. Hub 25 is telescoped over the second section and held in position by a retainer plate 56 and bolts 57. Provision is made for supplying vacuum, air and coolant through the shaft as needed for the various mold sections. Referring to FIGS. 8A and 8B, an inlet 58 and axial pipe 59 are fixed on the frame by a bracket 60a journalled with respect to shaft 21. Vacuum is applied to inlet 58 and tube 59. The end of tube 59 extends to a chamber 60 in the shaft section 52 which is closed by a plate 61 and radial passages 62 extend to the periphery of shaft section 52 to vacuum lines 63 for various functions such as label handling and the like.

As shown in FIG. 8A, the bracket 60a which supports tube 59 has a radial inlet 64 through which air is supplied and passes around the shaft 52 (FIG. 8B) to circumferentially spaced radially passages 65 that extend to the periphery of shaft section 52 to hoses 66 providing air to the air valve 42.

Referring to FIG. 8C, coolant is provided through a bracket 70 mounted by a bar 71 on the frame 20. Bracket 70 includes a coolant inlet 72 that supplies coolant about the periphery of the tube 73 and returns through the tube 73 to outlet 74, as presently described.

Figure 7:
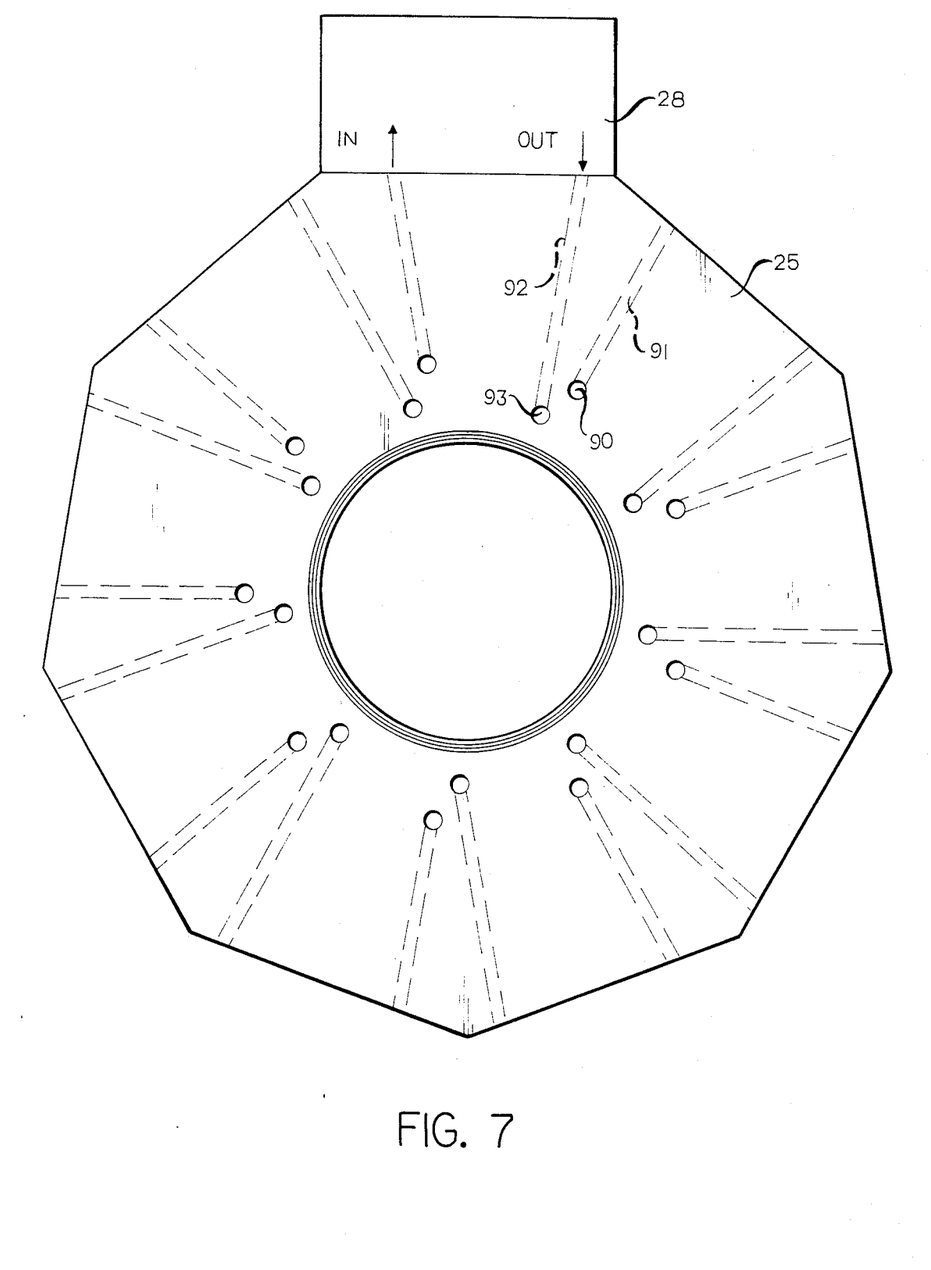
FIG. 7 is a partly diagrammatic view of a hub utilized in the apparatus.
Figure 9:
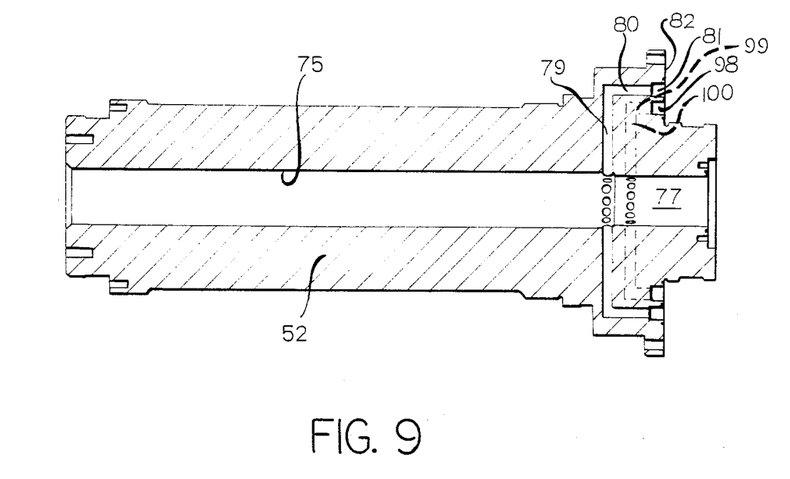
FIG. 9 is a longitudinal sectional view of a portion of the rotating shaft.
Figure 10:
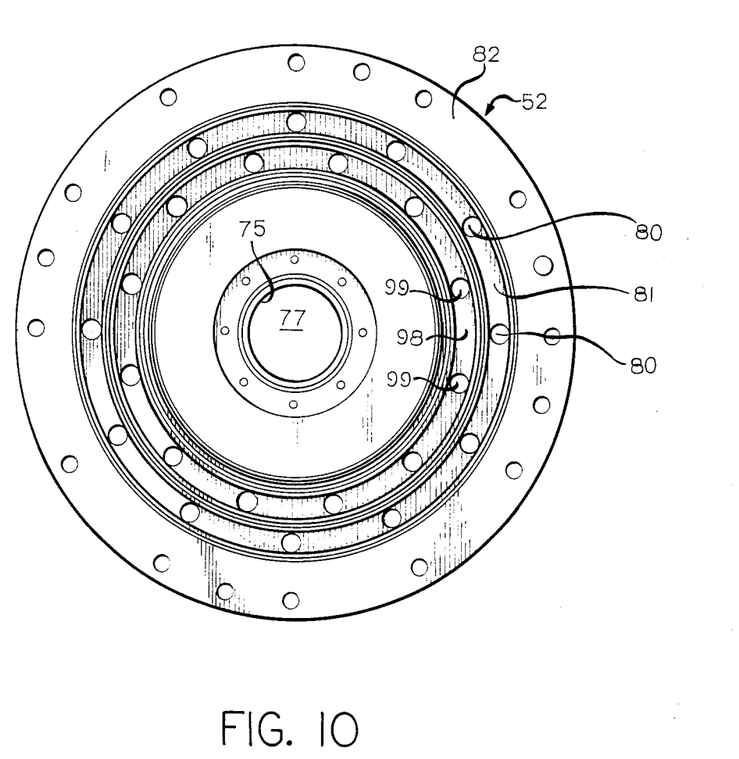
FIG. 10 is an end view of the shaft shown in FIG. 9 taken along the right end as viewed in FIG. 9.
Figure 11:
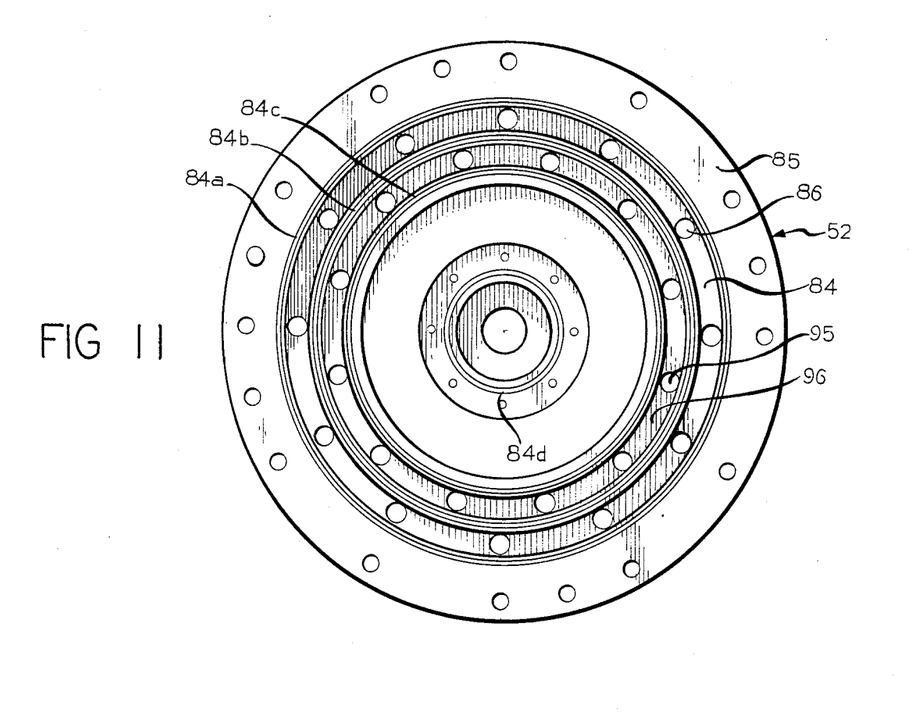
FIG. 11 is a sectional view taken along the line 11—11 in FIG. 8B.
Figure 12:
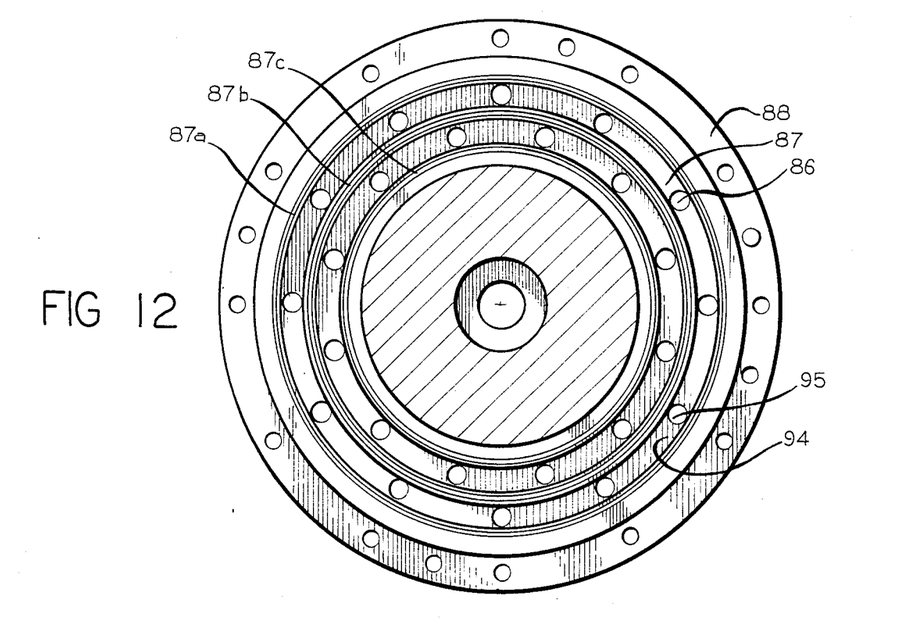
FIG. 12 is a sectional view taken along the line 12—12 in FIG. 8B.

As shown in FIG. 8B, coolant tube 73 extends through an opening 75 in the first shaft section 51 and has its end sealed by a flange and gasket 76 thereby providing a chamber 77 in the end of the shaft section 51 which is closed by a plate 78. A plurality of radial passages 79 extend from the periphery of the tube 73 to axial passages 80 which, in turn, extend to an annular groove in the face 82 of the shaft section 52 (FIGS. 9, 10). Wheel plate 22 is formed with axial openings 83 so that coolant can flow from annular passage 81 to an annular passage 84 in a radial surface of the shaft section 52 (FIGS. 8B, 11). Axial passages 86 extend from the groove 84 to an annular groove 87 in a radial surface 88 of shaft section 52 that seals against a surface 89 of the hub 25. Hub 25 includes circumferentially spaced axial passages 90 which communicate with radial passages 91 (FIGS. 7, 8B). Thus, coolant passes from the inlet 72 about the tube 73 through radial passages 79, axial passages 80, annular groove 81, axial passages 83 in the wheel plate, annular groove 84 and axial and radial passages 90, 91 in the hub 25.

Referring to FIG. 7, the coolant returning from each mold 28 after circulating in the mold in a conventional manner passes through radial passages 92 in the hub 25 through axial passages 93 in the hub to an annular groove 94 in face 88 of shaft section 52 and thereafter through axial passages 95 to a groove 96 in the radial face 85 of shaft section 52, axial passages 97 in the wheel plate to an annular groove 98 in shaft section 51 and, in turn, through short axial passages 99, radial passages 100 to chamber 77 and thereafter through the interior of the tube 73 to outlet 74.

Seals 84a, 84b, 84c and 84d are provided in grooves in one end of section 52 and seals 87a, 87b and 87c are provided in grooves in the other end of section 52 for engaging the surface of the wheel plate 22 and the hub 25, respectively.

It can thus be seen that the provision of the annular grooves 81, 98 and 84, 96 and 86, 94 provide a manifold for passage of coolant to and from the passages of the hub and, in turn, the mold sections. When a hub having a different number of mold sections is placed on the shaft section 52, the corresponding radial and axial passages thereof communicate with the grooves 86, 96 so no separate connections or adjustments need be made.

In order to provide coolant to the mold sections 27, short radial passages 101, 102 extend from the axial passages 86, 95 for connection with hoses to the mold sections.

I claim:
1. A blow molding apparatus comprising
   a frame,
   a wheel plate,
   a shaft rotatably mounted on said frame and extending horizontally,
   means for supporting said wheel plate on said shaft for rotation with said shaft,
   a first hub mounted on said shaft for rotation with said shaft,
   a plurality of sets of molds defining a mold cavity when closed,
   each said set comprising a pair of mold sections,
   said first hub having circumferentially spaced external surfaces, the number of surfaces corresponding to the number of sets of molds, one mold section of each said set being mounted on an external surface of said first hub such that said mold sections are circumferentially spaced about said first hub, a plurality of mold section slide assemblies removably mounting a second mold section of each said set on said wheel plate in circumferentially spaced relation and radial alignment with each said one mold section and for movement radially toward and away from said one mold section, the number of mold section slide assemblies corresponding to the number of sets of molds, each said slide assembly being removably mounted on said wheel plate, a second hub, said first hub being removable and said second hub being adapted to be replaced on said shaft, said second hub having a plurality of circumferentially spaced external surfaces for supporting mold sections, the number of the external surfaces of the second hub differing from the number of external surfaces of the first hub, said wheel plate having means for accommodating a different number of mold section slide assemblies to correspond with the different number of external surfaces on said second hub.

2. The blow molding apparatus set forth in claim 1 wherein each said mold section slide assembly includes a cam follower associated with its respective mold section, an arcuate cam mounted on said frame engaging each said cam follower and moving its respective mold section toward and away from its respective mold section on the hub as the wheel plate is rotated with respect to the cam.

3. The blow molding apparatus set forth in claim 1 wherein said means on said wheel plate for accommodating said mold section slide assemblies are circumferentially positioned to accommodate six, nine and twelve slide assemblies in respective equally spaced relation to one another.

4. The blow molding apparatus set forth in claim 1 wherein said shaft defines a manifold for coolant having inlet and outlet passages, each said hub having inlet and outlet passages for receiving coolant and returning coolant, said manifold means being positioned so that when the first hub is on said shaft, the inlet and outlet passages of said first hub communicate respectively with the inlet and outlet passages of said manifold, and when said second hub is placed on said shaft, the passages of said second hub communicate respectively with the inlet and outlet passages of said manifold.

5. The blow molding apparatus set forth in claim 4 wherein said inlet and outlet passages of said manifold comprises annular passages.

6. The blow molding apparatus set forth in claim 5 wherein said manifold has the annular inlet and outlet passages positioned in a radial surface of said shaft, each said hub having a complementary radial surface to which the inlet and outlet passages of said hub extend.

7. The blow molding apparatus set forth in claim 1 wherein said means for accommodating said slide assemblies comprises a first set of holes positioned for accommodating said first-mentioned set of slide assemblies and a second set of holes for accommodating said second-mentioned set of slide assemblies.

8. The blow molding apparatus set forth in claim 1 wherein said shaft comprises a first section and a second section, said wheel plate being telescoped onto said first section, means for fixing said wheel plate on said first section of said shaft.

9. The blow molding apparatus set forth in claim 8 wherein each said shaft section has an axial opening therein, a first axial pipe fixed on said frame and extending axially into the axial opening of said second section for applying vacuum, said axial pipe extending into a chamber in said axial opening of said second section, means for closing the axial opening in said second shaft section, said second shaft section having a plurality of circumferentially spaced radial passages extending to the periphery thereof.

10. The blow molding apparatus set forth in claim 9 including means for supplying air to the exterior of said first axial pipe in said section section of said shaft for supplying air, said second section having circumferentially spaced radial passages extending from said axial opening in said second section to the exterior of said second section.

11. The blow molding apparatus set forth in claim 8 including an axial tube extending axially into said axial opening in said first section of said shaft, means defining an inlet to the exterior of said axial pipe for supplying coolant, means for closing the end of the axial opening in said first section of said shaft, said first section having a plurality of circumferentially spaced radial passages extending from the axial opening and a plurality of axial passages extending from said radial passages to a radial surface of said first section, said inlet plate having a first radial surface complementing said radial surface of said first section and having axial passages aligned with the axial passages of said first section, said second section of said shaft having a first radial surface complementing a second radial surface of said wheel plate, said second section having axial passages aligned with the axial passages of said wheel plate, said second section having a second radial surface aligned with a radial surface on said hub, each said hub having first axial passages aligned with the axial passages of said second section and radial passages extending to the exterior of said hub for supplying coolant, each said hub having a second set of radial passages for returning coolant, said second section, wheel plate and first section having aligned axial passages communicating with said second set of axial passages of said hub for returning coolant, said first section having radial passages extending to the interior of said axial pipe of said first section for returning coolant.

12. The blow molding apparatus set forth in claim 11 wherein said second secton of said shaft has annular grooves on the second radial surface thereof communicating with the axial inlet passages and axial outlet passages, respectively, in said hub, and said axial passages in said second section, said second section of said shaft having annular grooves in the first radial surface thereof in communication with the axial passages in said second section and the axial passages in said wheel plate, said first section of said shaft having annular grooves in the radial surface thereof communicating with said axial inlet and outlet passages in said wheel plate.

13. The blow molding apparatus set forth in claim 4 wherein each said inlet passage and outlet passage in said hub comprise an axial portion and a radial portion communicating with the external surface on the hub.

14. A blow molding apparatus comprising
a frame,
a wheel plate,
a shaft rotatably mounted on said frame and extending horizontally,
means for supporting said wheel plate on said shaft for rotation with said shaft,
a hub removably mounted on said shaft for rotation with said shaft,
a plurality of sets of molds defining a mold cavity when closed,
each said set comprising a pair of mold sections,
said hub having circumferentially spaced external surfaces, the number of surfaces corresponding to the number of sets of mold sections,
one mold section of each said set being mounted on an external surface of said hub such that said mold sections are circumferentially spaced about said hub,
a plurality of mold section slide assemblies removably mounting a second mold section of each said set on said wheel plate in circumferentially spaced relation and radial alignment with each said one mold section and for movement radially toward and away from said one mold section,
the number of mold section slide assemblies corresponding to the number of sets of molds,
said wheel plate having means removably mounting said slide assemblies thereon.

15. The blow molding apparatus set forth in claim 14 wherein said shaft comprises
a first section and a second section,
said wheel plate being telescoped onto said first section,
means for fixing said wheel plate on said first section of said shaft.

16. The blow molding apparatus set forth in claim 15 wherein each said shaft section has an axial opening therein,
a first axial pipe fixed on said frame and extending axially into the axial opening of said second section for applying vacuum,
said axial pipe extending into a chamber in said axial opening of said second section,
means for closing the axial opening in said second shaft section,
said second shaft section having a plurality of circumferentially spaced radial passages extending to the periphery thereof.

17. The blow molding apparatus set forth in claim 16 including
means for supplying air to the exterior of said first axial pipe in said second section of said shaft for supplying air,
said second section having circumferentially spaced radial passages extending from said axial opening in said second section to the exterior of said second section.

18. The blow molding apparatus set forth in claim 15 including an axial tube extending axially into said axial opening in said first section of said shaft,
means defining an inlet to the exterior of said axial pipe for supplying coolant,
means for closing the end of the axial opening in said first section of said shaft,
said first section having a plurality of circumferentially spaced radial passages extending from the axial opening and a plurality of axial passages extending from said radial passages to a radial surface of said first section,
said inlet plate having a first radial surface complementing said radial surface of said first section and having axial passages aligned with the axial passages of said first section,
said second section of said shaft having a first radial surface complementing a second radial surface of said wheel plate,
said second section having axial passages aligned with the axial passages of said wheel plate,
said second section having a second radial surface aligned with a radial surface on said hub,
said hub having first axial passages aligned with the axial passages of said second section and radial passages extending to the exterior of said hub for supplying coolant,
said hub having a second set of radial passages for returning coolant,
said second section, wheel plate and first section having aligned axial passages communicating with said second set of axial passages of said hub for returning coolant,
said first section having radial passages extending to the interior of said axial pipe of said first section for returning coolant.

19. The blow molding apparatus set forth in claim 18 wherein
said second section of said shaft has annular grooves on the second radial surface thereof communicating with the axial inlet passages and axial outlet passages, respectively, in said hub, and said axial passages in said second section,
said second section of said shaft having annular grooves in the first radial surface thereof in communication with the axial passages in said second section and the axial passages in said wheel plate,
said first section of said shaft having annular grooves in the radial surface thereof communicating with said axial inlet and outlet passages in said wheel plate.

20. A blow molding apparatus comprising
a frame,
a wheel plate,
a shaft rotatably mounted on said frame and extending horizontally,
means for supporting said wheel plate on said shaft for rotation with said shaft, a plurality of sets of molds defining a mold cavity when closed, each said set comprising a pair of mold sections, a hub removably mounted on said shaft for rotation with said shaft, said hub being adapted to support a plurality of mold sections, one section of each said mold set in circumferentially spaced relation about said hub, mold section mounting means adapted to removably mount a second section of each mold set on said wheel plate in circumferentially spaced relation and radial alignment with each said mold sections on said hub and for movement toward and away from said mold sections on said hub, said shaft defining a manifold for coolant having inlet and outlet passages, said hub having inlet and outlet passages for receiving coolant and returning coolant, said manifold being positioned so that when the hub is on said shaft, the inlet and outlet passages of said hub communicate respectively with the inlet and outlet passages of said manifold.

21. The blow molding apparatus set forth in claim 20 wherein said inlet and outlet passages of said manifold comprises annular passages.

22. The blow molding apparatus set forth in claim 21 wherein said manifold has the annular inlet and outlet passages positioned in a radial surface of said shaft, said hub having a complementary radial surface to which the inlet and outlet passages of said hub extend.

23. The blow molding apparatus set forth in claim 22 wherein each said inlet passage and outlet passage in said hub comprise an axial portion and a radial portion communicating with the external surface on the hub.

* * * * *